March 2, 1948. N. L. DAHLANDER 2,436,792
CARGO HOOK
Filed Sept. 6, 1945
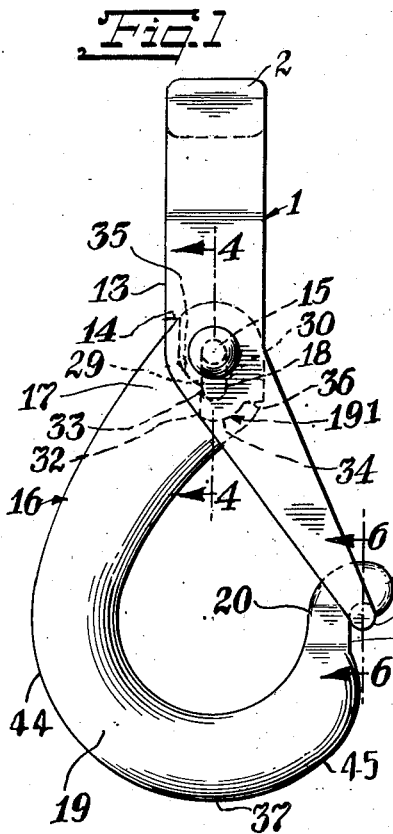
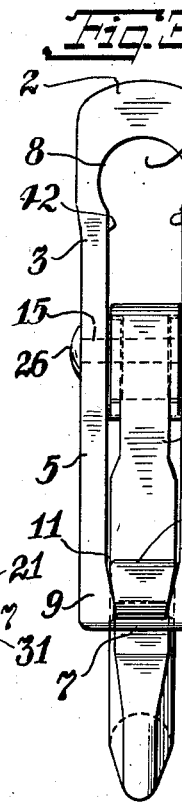
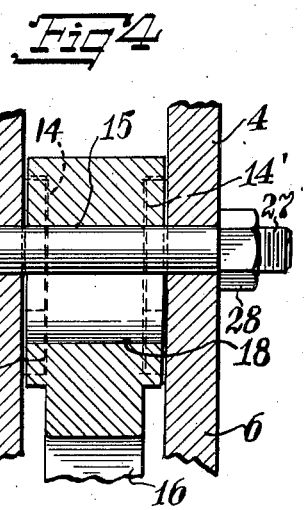
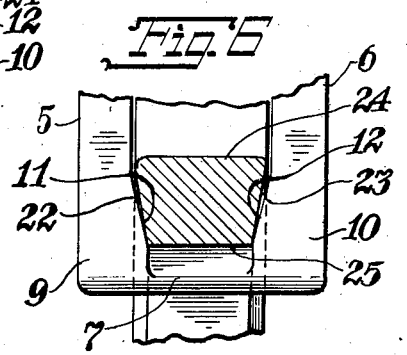
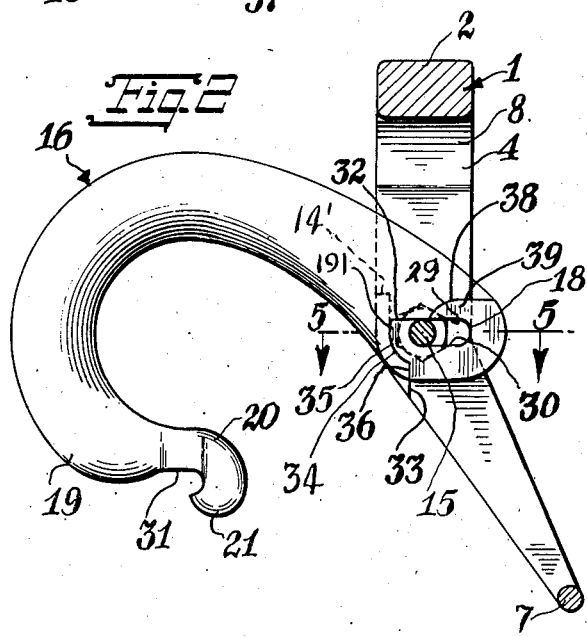
INVENTOR.
Noël L. Dahlander
BY
ATTORNEY Patented Mar. 2, 1948

2,436,792

UNITED STATES PATENT OFFICE 2,436,792

CARGO HOOK

Noël L. Dahlander, New Milford, Pa., assignor of one-half to Robert J. Earl, Deerfield Beach, Fla.

Application September 6, 1945, Serial No. 614,775

4 Claims. (Cl. 24—241)

This invention relates to cargo hooks in general and more especially to the type known as safety tackle hooks.

Among the objects of the present invention, it is aimed to provide an improved cargo hook which can with facility be locked while carrying a load or in load carrying position and which can with facility be unlocked or opened after a load has been deposited.

It is also an object of the present invention to provide an improved safety cargo hook which will distribute the wearing surfaces in load carrying position so that no single shearing point will be exposed to wear and in load carrying position, extensive surfaces will be required to receive the load carrying force.

These and other features, capabilities and advantages of the invention will appear from the subjoined detail description of one specific embodiment thereof illustrated in the accompanying drawings, in which Fig. 1 is a side elevation of the hook and clevis in closed position;

Fig. 2 is a side elevation partly in section of the hook and clevis in open position;

Fig. 3 is an end view of the hook and clevis in closed position;

Fig. 4 is an enlarged fragmental section on the line 4—4 of Fig. 1;

Fig. 5 is an enlarged fragmental section on the line 5—5 of Fig. 2;

Fig. 6 is a fragmental section on the line 6—6 of Fig. 1.

The clevis 1 forming a part of the improved safety cargo hook has in the embodiment shown, a bridge or cross-piece 2 at its upper end, two side bars 3 and 4, which in the present instance continue in the two extensions 5 and 6 respectively bent at an angle of about fifty to sixty-five degrees. The extensions 5 and 6 have a bridge or cross-piece 7 at their ends. Preferably, the bridge 2 has the greatest thickness and diameter, and the side bars 3 and 4 are about equal in cross-section throughout while the extensions 5 and 6 diminish in cross-section as they leave the side bars 3 and 4 respectively terminating in a very small cross-section, which, however, corresponds substantially to the cross-section of the bridge or cross-piece 7. Furthermore, see Fig. 3, the opening 41 between the side bars 3 and 4 and the cross-piece 2 is preferably arcuate, as for instance the inner curved arcuate face 8.

One of the features of the present invention resides in forming the enlarged portions 9 and 10 adjacent the bridge or cross-piece 7 so that their inner faces 11 and 12 incline toward one another as they approach the cross-piece 7, see particularly Fig. 6. The arms 3 and 4 of the clevis 1 adjacent the edges 13 along the bend between the arms 3, 4 and the extensions 5 and 6 are provided with the shoulders 14 and 14' extending from the inner opposing faces 42 and 43 of the arms 3 and 4 and extensions 5 and 6 respectively. These shoulders 14, 14 cooperate with the cross-piece 7 to support the hook portion now to be described whether or not the pin 15 is in place.

In other words, if the pin 15 should shear and break, the hook portion 16 will not drop off or open and release the load but will be anchored in place by the shoulders 14 and the cross-piece 7.

The hook or hook element 16 consists essentially of an upper hinged part 17 having therein the elongated recess 18, a crook portion 19, and a finger 20 having a lip 21. The finger 20 in the present instance is much smaller in cross-section than the cross-section of the crook 19 and the cross-section of the crook 19 in turn is preferably smaller than the hinged portion 17, all dimensions designed to conform to predetermined force requirements, which do not constitute any part of the present invention. The finger 20 and lip 21, see Fig. 6, have inclined faces 22, 23 converging in a direction from the upper face 24. The angle of the inclined faces 22, 23 where the finger 20 opposes the enlargements 9 and 10, see Fig. 3, is substantially the same and since the lower end of the finger 20 at the face 25 is conformed substantially to the length of the upper surface of the cross-piece 7 between the enlargements 9 and 10, the finger 20, when it is in closed position, that shown in Figs. 1, 3 and 6, will not only engage the cross-piece 7 but also the faces 11 and 12 of the enlargements 9 and 10 in order to distribute the load carrying force on the surfaces 11, 12 and the upper face of the cross-piece 7.

The pin 15 as shown may consist of an ordinary bolt having a head 26 and a threaded portion 27 to receive the nut 28, the head in the present instance engaging the outer face of the arm 3 and the nut 28 engaging the outer face of the arm 4 adjacent to the extensions 5 and 6, or practically at the intersection between the arms 3, 4 and extensions 5, 6 respectively. The hinged part 17 preferably has shoulders 39 and 19 constituting enlargements formed around the slot 18.

In closed position, see Fig. 1, it is desirous that the sides 29 and 30 of the slot 18 are parallel to the face 31 of the finger 20 and furthermore, that the end faces 32 of the shoulders 191 are in alinement with the face 29 of the slot 18 and also in alinement with the faces 33 of shoulders 14 on the inner faces of the bars 3 and 4. Preferably, the outer arcuate faces 34 of the shoulders 191 as shown conform to the arcuate faces 35 of the shoulders 14 and 14' and the shoulders 36 are positioned, see Fig. 2, so that the shoulders 36 engage the end faces 33 of the shoulders 14 and 14' when the hook 16 has been raised into an open position.

When the faces 31, 32 and 33 are in alinement with the sides 29 and 30 of the elongated slot 18 in closed position of the hook as shown in Fig. 1, then if the load has been carried to the desired location and it is then desired to open the hook, it will only be necessary to drop the clevis 1 with its hook 16 so that the hook 16 strikes the cargo or adjacent supporting surface at a point in the proximity of 37, when the hook portion 16 moves up along the pin 15 of the clevis 1 in lines parallel to the faces 31, 32, 33, 29 and 30. Thereafter, if it is then desired to swing the hook portion 16 into the position shown in Fig. 2, particularly after the pin 15 engages the lower face of the slot 18, the shoulders 191 will slide alongside of the shoulders 14 and 14', with the arcuate faces 34 engaging the arcuate faces 35 as shown in Fig. 2. It has been found that by the parallel arrangement of these several faces, a smooth acting hook will be provided and the action of same be effectively controlled both for opening and closing the hook out of and into the closed position shown in Fig. 1. Furthermore, this parallel arrangement of these several faces 29, 30, 31, 32 and 33 will also cooperate effectively to bring the faces 22 and 23 of the finger 20 into engagement with the faces 11 and 12 of the enlargements 9 and 10 respectively.

While the present clevis is shown as provided with a bridge 2 that is suitable for connecting the same to the link of a chain which will hoist a cable, it is of course obvious without departing from the spirit of the invention that the upper end of the clevis 1 might be threaded to receive the collar of a suitable hoisting rig which may be adapted to receive different types of rigging apparatus.

It is of course also obvious that the pin 15 will not be positioned until after the hook portion 16 is positioned so that its slot 18 alines with the pin 15. Should the pin or bolt 15 be sheared due to wear, when the hook 16 is in closed position, that is with the arcuate faces 38 of the shoulders 39 engaging the arcuate faces 35 of the shoulders 14, and the lip 21 of the finger 20 engaging the cross-piece 7, it will of course be apparent that the hook 16 will not open, but continue to carry the load, the shoulders 14 cooperating with the shoulders 39 in turn cooperating with the cross-piece 7 and lip 21 to maintain the hooked portion 16 in closed position with the clevis 1.

Due to the fact, see particularly Fig. 3, that the hook portion 16 at 40 is diminished for a distance equal to the distance of movement of the pin 15 in the slot 18, it is possible to assemble the clevis 1 and hook 16 by introducing the hinge portion 17 either up between the extensions 5 and 6 or between the arms 3 and 4 above the recess 18.

Obviously, from a closed position, the hook can only move up along the pin 15 in lines parallel to the faces 31 and 33 and when the pin 15 is in position, the end faces 32 and 33 will then be opposing one another so that the hook cannot be swung into open position until the end faces 32 move up and clear the end faces 33. When the pin 15 is not in position, that is before the hook 16 and clevis 1 are assembled, the hinge portion 17 might either be introduced, see Fig. 2, from the left thereof through the space between the arms 3 and 4 above the shoulders 14 and 14', and then the hook portion dropped down into the position shown in Fig. 2 before inserting the pin 15, or else the hinge portion 17 brought up between the extensions 5 and 6 and rocked around until it registers with the bore of the pin 15 to receive the pin 15. The end faces 33 also cooperate with the shoulders 36 to limit the outward swing of the hook portion 16 into open position.

Still furthermore, when the sides of the slots 18 are substantially parallel to the edges of the side bars 3 and 4, see Fig. 1, particularly when a line drawn through the middle of either slot 18 coincides substantially with the axis of the composite hook including the clevis 1 and the hook portion 16, that is, coincides substantially with the plane drawn on the line 4—4 of Fig. 1, then after the hook portion 16 has been opened into the position shown in Fig. 2, and it is allowed to swing into closed position, it will of its own accord ride into the locked position shown in Fig. 1. However, after the hook portion 16 has moved into the closed position shown in Fig. 1, a lateral thrust either on the left hand edge 44 of the crook portion 19 or on the right hand edge 45 of the crook portion 19, see Fig. 1, or for that matter, a lateral thrust on the crook portion 19 from any angle will not be effective to open the hook, that is, enable the lip 21 to clear the pin 15. On the other hand, when a load has been deposited and slack is formed in the lanyard connected to the clevis 1, and the edge 37 of the crook portion 19 strikes the load after depositing the same, then the lip 21 will readily clear the crosspiece 7 and swing toward the position shown in Fig. 2.

It is obvious that various changes and modifications may be made to the details of construction without departing from the general spirit of the invention as set forth in the appended claims.

I claim:

1. A cargo hook comprising a clevis and a hook element, the clevis having parallel bars, an extension for each of said bars, a cross-piece connecting the ends of said extensions, the hook element having an elongated slot at one end, a pin disposed at the intersection between said arms and extensions and extending through said slot, a lip at the other end of said hook element engaging said cross-piece in cargo carrying position, shoulders on said clevis, shoulders on said hook element adjacent to its slot, the sides of said slot and the end faces of the shoulders of said clevis and the end faces of the shoulders of said hook element being parallel to facilitate releasing said lip from said cross-piece.

2. A cargo hook comprising a clevis and a hook element, the clevis having parallel bars, an extension for each of said bars, a cross-piece connecting the ends of said extensions, the hook element having an elongated slot at one end, a pin disposed at the intersection between said arms and extensions and extending through said slot, a lip at the other end of said hook element engaging said cross-piece in cargo carrying position, shoulders on said clevis, shoulders on said hook element adjacent to its slot, said hook element having a face adjacent to said lip parallel to the sides of said slot and to the end faces of the shoulders of said clevis and of the shoulders of said hook element to facilitate releasing said lip from said cross-piece.

3. A cargo hook comprising a clevis and a hook element, the clevis having side bars and extensions inclined to one another, a cross-piece at the end of said extensions, a pin at the intersection of said side bars and extensions, shoulders formed on said side bars adjacent to said pin, the hook element having an extended slot at one end to receive said pin, a finger at the other end of said hook element, a lip at the end of said finger to engage said cross-piece when said hook element is in closed position, two pairs of shoulders on said hook element, one pair of shoulders cooperating with the shoulders of said clevis when said hook element is in closed position to supplement said pin should said pin snap in cargo carrying position, the other pair of shoulders on said hook element cooperating with the shoulders on said clevis to limit the opening position of said hook element, the sides of said slot being parallel with the end faces of the shoulders on said clevis and of the end faces of the shoulders on said hook element to facilitate movement of the hook element relative to said pin to release the lip from said cross-piece.

4. A cargo hook comprising a clevis and a hook element, the clevis having side bars and extensions inclined to one another, a cross-piece at the end of said extensions, a pin at the intersection of said side bars and extensions, shoulders formed on said side bars adjacent to said pin, the hook element having an extended slot at one end to receive said pin, a finger at the other end of said hook element, a lip at the end of said finger to engage said cross-piece when said hook element is in closed position, two pairs of shoulders on said hook element, one pair of shoulders cooperating with the shoulders of said clevis when said hook element is in closed position to supplement said pin should said pin snap in cargo carrying position, the other pair of shoulders on said hook element cooperating with the shoulders on said clevis to limit the opening position of said hook element, the finger having a face adjacent to said lip parallel to the sides of said slot, also parallel to the end faces of the shoulders of said clevis and to the end faces of the shoulders of said hook element to facilitate movement of said hook element relative to said pin when moving said hook element into open position.

NOËL L. DAHLANDER.

REFERENCES CITED

The following references are of record in the file of this patent:

UNITED STATES PATENTS

| Number | Name | Date |
|---|---|---|
| 2,359,557 | Hoffman | Oct. 3, 1944 |